(12) United States Patent
Anzioso et al.

(10) Patent No.: US 7,245,035 B2
(45) Date of Patent: Jul. 17, 2007

(54) MODULAR ENERGY-GENERATING SYSTEM

(75) Inventors: Franco Anzioso, Orbassano (IT);
Roberto Maceratini, Orbassano (IT);
Carlo D'Ambrosio, Orbassano (IT);
Pasquale Campanile, Orbassano (IT)

(73) Assignee: CRF Societa Consortile per Azioni, Orbassano, Turin (IT)

( * ) Notice: Subject to any disclaimer, the term of this patent is extended or adjusted under 35 U.S.C. 154(b) by 69 days.

(21) Appl. No.: 11/290,456

(22) Filed: Dec. 1, 2005

(65) Prior Publication Data
US 2006/0163878 A1 Jul. 27, 2006

(30) Foreign Application Priority Data
Jan. 21, 2005 (EP) ................................. 05425023

(51) Int. Cl.
*H02P 9/04* (2006.01)
*F01K 13/00* (2006.01)

(52) U.S. Cl. ............................. 290/2; 290/1 A; 60/646
(58) Field of Classification Search ................ 290/1 A, 290/2, 4 R, 52; 60/646, 679, 641.1
See application file for complete search history.

(56) References Cited

U.S. PATENT DOCUMENTS

| | | | |
|---|---|---|---|
| 5,845,496 A * | 12/1998 | Bachmann | 60/646 |
| 6,192,687 B1 * | 2/2001 | Pinkerton et al. | 60/646 |
| 6,294,842 B1 * | 9/2001 | Skowronski | 290/7 |
| 6,321,145 B1 * | 11/2001 | Rajashekara | 701/22 |
| 6,494,042 B2 * | 12/2002 | Bronicki | 60/651 |
| 6,854,273 B1 * | 2/2005 | Lasley et al. | 60/646 |
| 7,150,153 B2 * | 12/2006 | Browe | 60/641.1 |

FOREIGN PATENT DOCUMENTS

| | | |
|---|---|---|
| DE | 33 41 891 A1 | 5/1985 |
| DE | 195 35 752 A1 | 3/1997 |
| DE | 197 40 398 A1 | 3/1999 |
| DE | 103 39 564 A1 | 3/2004 |
| WO | WO 03/087674 A | 10/2003 |

* cited by examiner

Primary Examiner—Nicholas Ponomarenko
(74) Attorney, Agent, or Firm—Sughrue Mion, PLLC

(57) ABSTRACT

The system comprises a main combined generating module which can be supplied with a flow of a fuel and which can generate electrical energy and thermal energy in the form of a flow of at least a first hot fluid, preferably water. The main module has an electrical output terminal or node which can be connected directly to electrical user appliances and which can also be connected in parallel with an external electrical generating and distribution network by means of a controlled switching device.

7 Claims, 4 Drawing Sheets

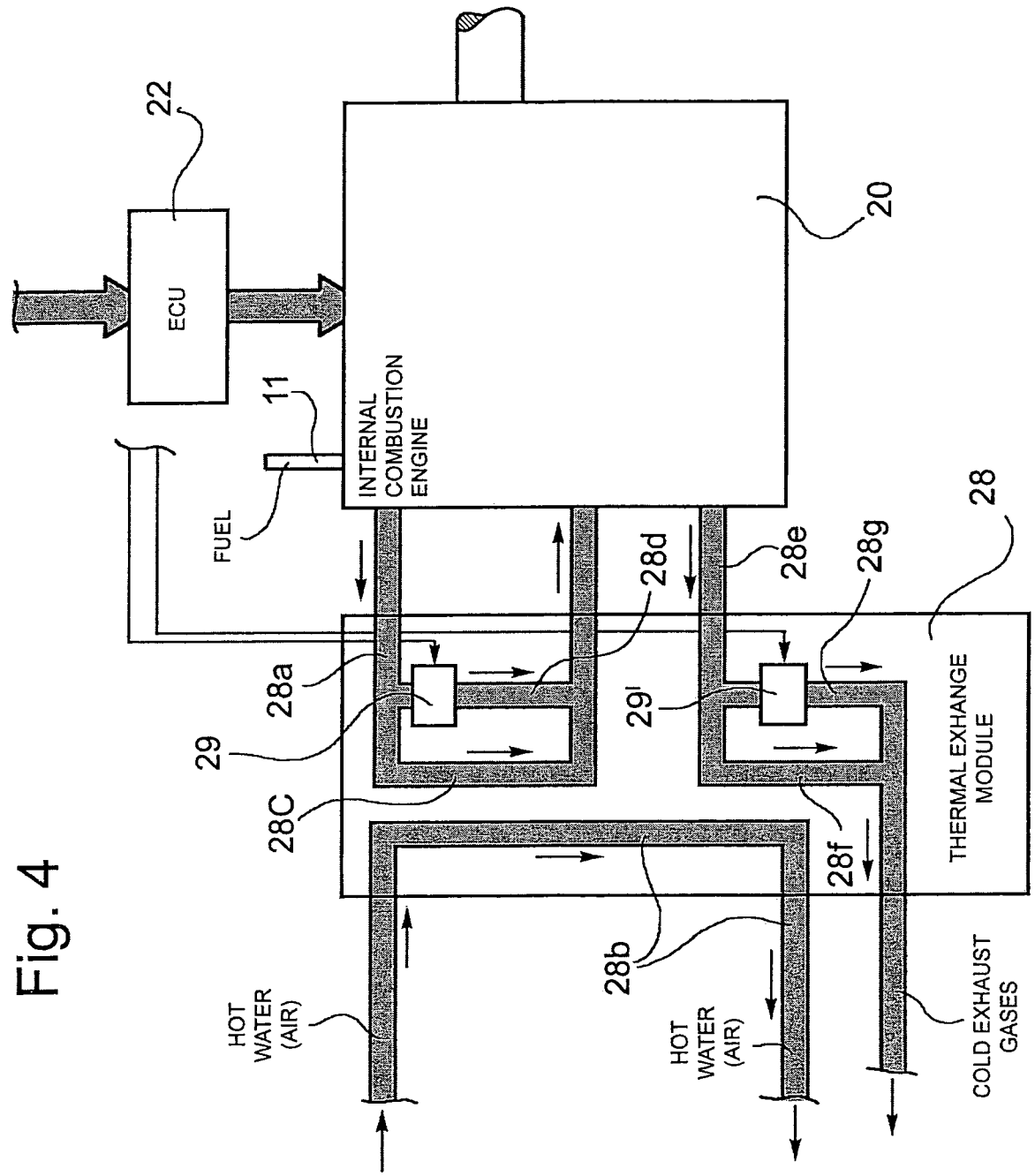

MODULAR ENERGY-GENERATING SYSTEM

BACKGROUND OF THE INVENTION

The present invention relates to a modular energy-generating system.

More specifically, the invention relates to an innovative triple generating system, that is, a system which can produce electrical energy and thermal energy, the latter in two usable forms, that is, high-temperature energy usable, for example, for heating and/or for services, and low-temperature energy usable, for example, for the conditioning of environments and/or services.

SUMMARY OF THE INVENTION

The modular energy-generating system according to the invention comprises substantially:

a main combined generating module which can be supplied with a flow of a fuel and which can generate electrical energy and thermal energy in the form of a flow of at least one first hot fluid, preferably water, the main module having an electrical output terminal or node which can be connected directly to electrical user appliances and which can also be connected in parallel with an external electrical-energy generation and distribution network by means of a controlled switching device, an auxiliary generating module which can be supplied with thermal energy produced by the main module and which can supply thermal energy at a lower temperature in the form of a flow of at least one second, cooled fluid, and supervision and control means arranged to control the operation of the main module and of the auxiliary module in accordance with predetermined procedures, the main combined generating module comprising:

an electrical-energy generator unit including an internal combustion engine which is supplied with the fuel and is coupled to a rotary, preferably three-phase, alternating-current electrical generator, an electronic converter unit including an ac/dc converter connected to the output of the electrical generator, a dc/ac converter which preferably has a three-phase output with neutral and which is connected to the output of the ac/dc converter by means of a dc link and to the electrical output terminal or node of the main module, and an electrical-energy storage module coupled to the dc link by means of a bidirectional dc/dc converter in a manner such that the dc/dc converter can permit a flow of electrical energy from the storage module to the dc link and vice versa, and a thermal exchange module which is connected to the internal combustion engine and can recover some of the heat generated by the engine, transferring the heat to the at least one first fluid, the thermal exchange module having control solenoid-valve means suitable for enabling the extent of the recovery of the heat generated by the internal combustion engine to be varied, the auxiliary generating module comprising a heat pump which is intended to receive a flow of a hot fluid from the thermal exchange module or from the internal combustion engine and which can output a flow of the at least one second fluid at relatively lower temperature, the supervision and control means being arranged for:
regulating the electrical power generated by the main module by controlling the rate of rotation and the injection of fuel in the internal combustion engine in a manner such that the engine operates with a predetermined output, regulating the ratio between the electrical power and the thermal power generated by the main module by controlling the rate of rotation and the torque delivered by the internal combustion engine and driving the control solenoid-valve means in accordance with predetermined procedures, controlling the operation of the main module in accordance with predetermined procedures in a mode in which it is disconnected from the distribution network or in a mode in which it is connected thereto, and controlling automatic changing from one to the other of the above-mentioned operative modes without interrupting the supply of energy to the electrical user appliances, when the main module is connected to the network, regulating the output voltage and the power factor of the main module and compensating for any deviations from the sinusoidal form of the current absorbed by the electrical user appliances, and whilst the energy-generator unit is de-activated, detecting a condition of interruption of service of the electrical network and ensuring the continuity of electrical supply to at least some of the electrical user appliances with electrical energy delivered by the storage module for a minimum period of time sufficient to render the electrical generator unit operative.

BRIEF DESCRIPTION OF THE DRAWINGS

Further characteristics and advantages of the invention will become clear from the following detailed description which is given purely by way of non-limiting example with reference to the appended drawings, in which:

FIG. 4 is a partial block diagram which shows an embodiment of a thermal exchange module included in a modular energy-generating system according to the present invention.

DETAILED DESCRIPTION OF THE INVENTION

Figure 1:
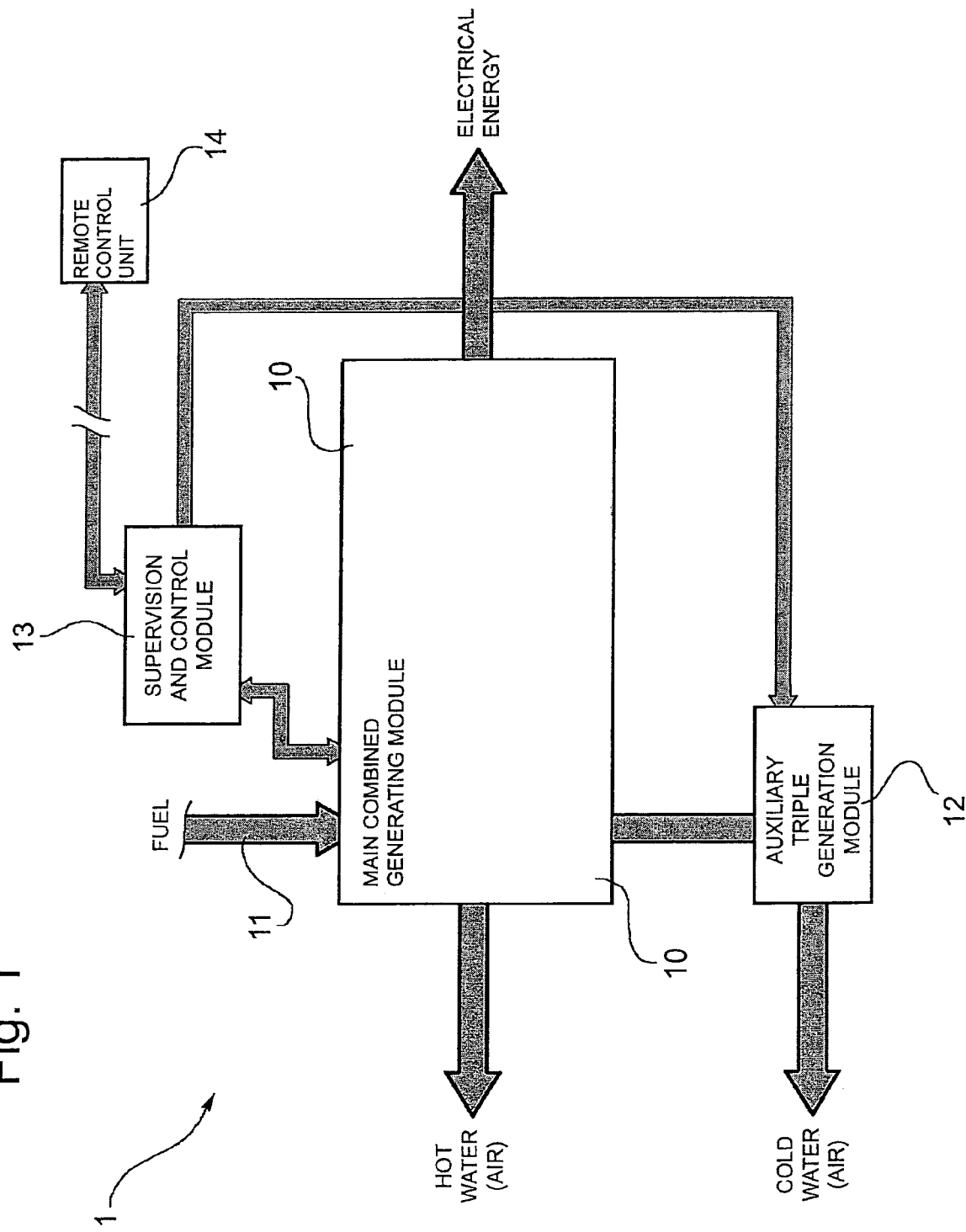
FIG. 1 is a block diagram which shows the general architecture of a modular energy-generating system according to the present invention.
Figure 2:
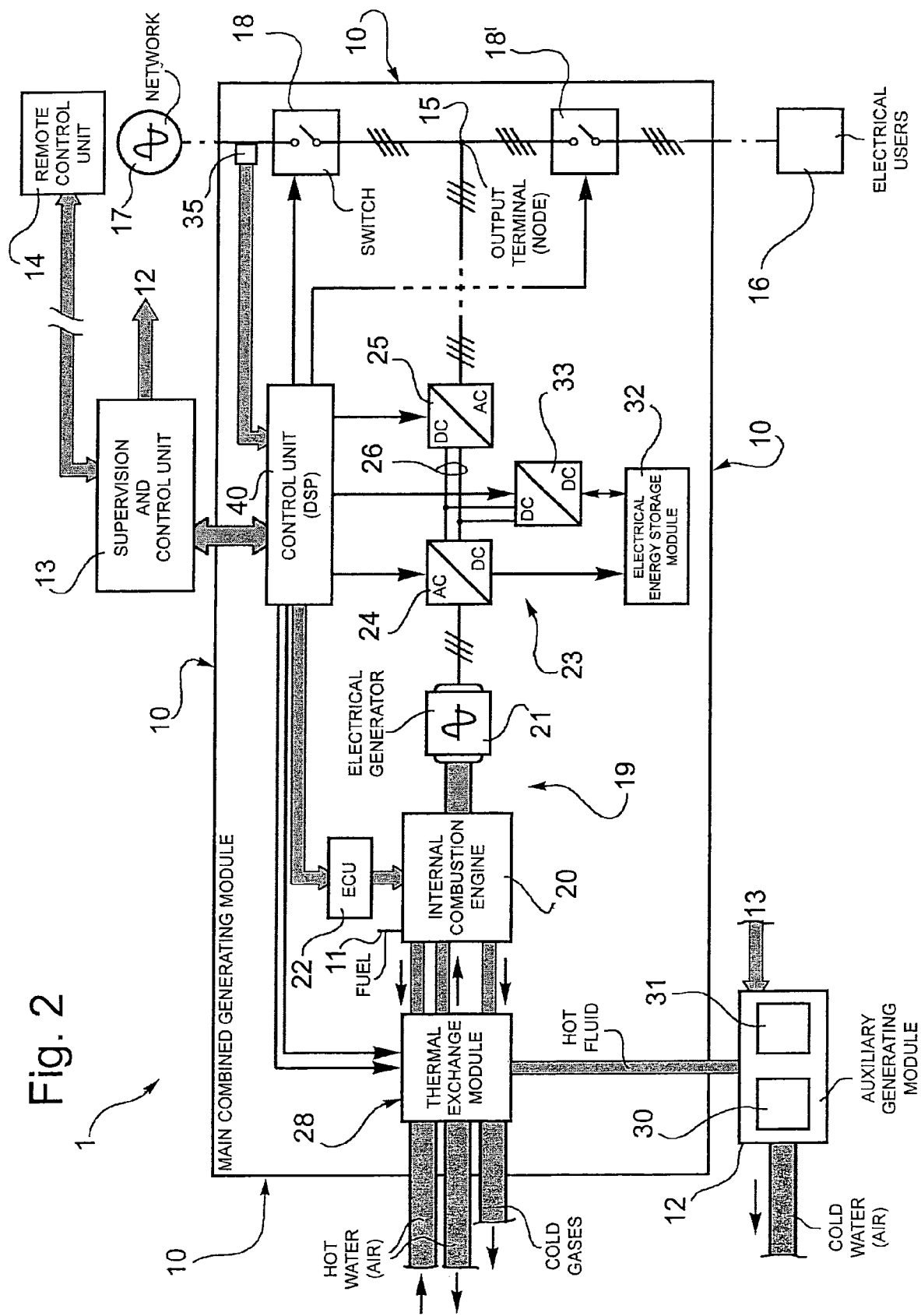
FIG. 2 is a block diagram which shows the structure of a system according to the present invention in greater detail.

A modular energy-generating system, or polygenerator, according to the invention is generally indicated 1 in FIGS. 1 and 2.

As will become clearer from the following description, the system or polygenerator 1 permits the combined production of several energy carriers. In particular, the system or polygenerator permits the production of electrical energy and hot or cold thermal energy with the capability:

to regulate the power delivered within a very wide range from 30% to more than 100% of the nominal power (for transient periods), whilst keeping the efficiency of the conversion of the primary energy of the fuel used almost constant, to modulate the ratio between the electrical power and the thermal power generated, to follow or satisfy a variable electrical and/or thermal power demand, to supply electrical user appliances that are connected or are not connected to an electrical-energy generation/distribution network, for electrical user appliances that are connected to a network, the polygenerator system enables the energy demand of the users to be sustained without discontinuity even in the event of interruptions in the energy-supply service by the network, and for the supply of electrical user appliances that are connected to a generating/distribution network, to attenuate disturbances in the quality of the electrical service which come from the network and/or are input into the network.

With reference to FIGS. 1 and 2, the modular system or polygenerator 1 comprises substantially a main combined generating module 10 which can be supplied with a flow of a fuel 11 and can generate electrical energy as well as thermal energy in the form of a flow of at least a first hot fluid, preferably water or possibly air.

An auxiliary, triple-generation module 12 which is associated with the main combined generating module 10 can be supplied, in operation, with thermal energy produced by the main module 10 and can supply thermal energy at a lower temperature in the form of a flow of at least one second cooled fluid, for example, water or possibly air.

A supervision and control module, indicated 13 in FIGS. 1 and 2, is arranged to control the operation of the main module 10 and of the associated auxiliary module 12 in accordance with predetermined procedures. The local supervision and control module 13 may in turn be connected to a remote control unit 14. In this case, the local supervision and control module 13 and the remote control unit 14 may be arranged for implementing remote control procedures, performing, for example, functions for monitoring the operating parameters, scheduling production, control of production in real time with adaptation to variations in the local energy demand and optionally in dependence on changes in energy prices, multi-timetable tariffs, diagnostics and possibly prognostics, with automatic activation of intervention and maintenance procedures, etc.

A remote control unit 14 may optionally be connected to a plurality of modular generation systems or polygenerators according to the present invention and may then advantageously be arranged for the coordinated control of the operation of that plurality of systems or polygeneraors, even if they are installed at different sites.

With reference to FIG. 2, the main combined generating module 10 has an electrical output terminal or node 15 which can be connected directly to electrical user appliances, generally indicated 16, and which can also be connected in parallel with an external electrical-energy generation/distribution network 17 by means of a controlled switching device 18 of known type. This switching device may be of an electromechanical or solid-state type. A further, similar switching device 18' may be interposed between the output node 15 and the electrical user appliances 16.

As shown in particular in FIG. 2, the main combined generating module 10 comprises an electrical-energy generator unit 19 including an internal combustion engine 20 which is supplied with the fuel 11 and is connected to a rotary., preferably three-phase, alternating-current electrical generator, indicated 21.

An electronic control unit (ECU) 22 is associated with the internal combustion engine 20.

The rotary electrical generator 21 is, for example, an asynchronous three-phase generator.

A conventional electric starter motor (not shown) may be associated with the internal combustion engine 20. Alternatively, the electrical generator 21 may be a reversible electrical machine which can operate both as a generator and as a motor and, in the motor mode of operation, can be used for starting the associated internal combustion engine 20.

An electronic converter unit, generally indicated 23, is connected to the output of the rotary electrical generator 21. This unit comprises an ac/dc converter 24 connected to the output of the generator 21 and a dc/ac converter or inverter 25 connected to the output of the converter 24 by means of a dc link 26.

The dc/ac converter 25 preferably has a three-phase output with neutral and is connected to the output terminal or node 15.

The main combined generating module 10 further comprises a thermal exchange module 28 (FIGS. 2 and 4) which is connected to the internal combustion engine 20 and can recover some of the heat generated by that engine in operation, transferring the heat to a fluid which, as already stated, is advantageously water or possibly air.

With reference to the schematic view of FIG. 4, the module 28 may comprise a liquid/liquid or liquid/air heat exchanger for transferring the heat recovered from the fluid (for example, the cooling water of the engine 20), which flows in the input circuit 28a, to the fluid flowing in the output circuit 28b.

Advantageously, the input circuit 28a comprises a duct 28c arranged for thermal exchange with the output circuit 28b and a by-pass duct 28d which is not arranged for exchange with the output duct but which, when appropriate or necessary, enables at least some of the heat transported by the liquid flowing in the input circuit 28a to be dissipated. At least one regulation solenoid-valve 29 is interposed in the by-pass duct 28d, which is hydraulically in parallel with the duct 28c, enabling the flow-rate of the cooling liquid of the engine 20 through the by-pass duct to be varied from zero to a predetermined maximum value.

The module 28 may also, comprise a gas/liquid or gas/air heat-exchanger for transferring heat recovered from the exhaust gases of the engine 20, which flow in a duct of a further input circuit 28e of the module 28, to the fluid flowing in the output circuit 28b.

Advantageously, the input circuit 28e comprises a duct 28f arranged for thermal exchange with the output circuit 28b and a by-pass duct 28g which is not arranged for exchange with an output duct 28b but which, when appropriate or necessary, enables at least some of the heat transported by the gas flowing in the circuit 28e to be dissipated by sending it directly to a flue. At least one regulation solenoid-valve 29' is interposed in the by-pass duct 28g, which is hydraulically in parallel with the duct 28f, enabling the flow-rate of the exhaust gases of the engine through the by-pass duct to be varied from zero to a predetermined maximum value.

With reference to FIG. 2, the auxiliary generating module 12 comprises a heat pump 30 for receiving a flow of a hot fluid from the thermal exchange module 28 or even directly from the internal combustion engine 20, and which can output a flow of a fluid such as water or possibly air which is at a relatively lower temperature and which can be used for the conditioning of an environment and/or for other services or purposes. The heat pump 30 is, for example, of the chemical type, in particle, of the type with a desiccant liquid.

The auxiliary generating module 12 may also comprise a thermal-energy accumulator 31 of known type.

Still with reference to FIG. 2, an electrical-energy storage module 32 is connected to the dc link 26 of the electronic converter unit 23 by means of a bidirectional dc/dc converter 33. This converter 33 can permit a flow of electrical energy from the storage module 32 towards the dc link 26 and vice versa.

The main combined generating module 10 comprises an electronic control unit 40 including, for example, a microprocessor. The unit 40 is connected to the control inputs of the switching devices 18 and 18', to devices 35 for detecting the network voltage and current upstream of the switching devices 18 and 18', to the converters 24, 25 and 33, to the control unit 22 of the internal combustion engine 20, and to the solenoid-valves 29 and 29' of the thermal exchange module 28.

The control unit 40 of the main co-generation module 10 is also connected to and arranged for dialogue with the supervision and control module 13 which in turn is connected to and arranged for controlling the auxiliary generating module 12.

Figure 3:
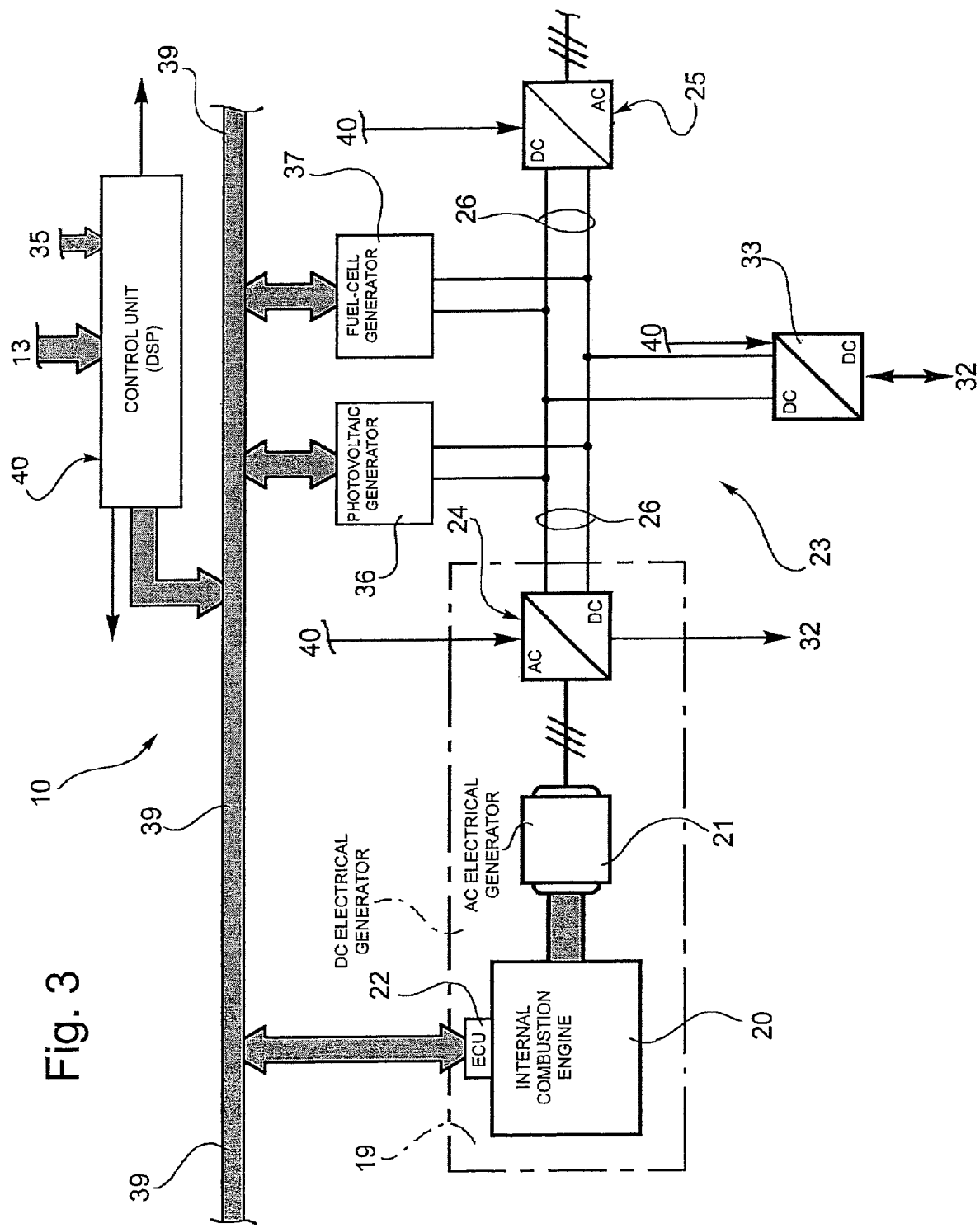
FIG. 3 is a block diagram which shows part of the structure of a variant of the generating system according to the invention.

In variants of the main combined generating module 10, the output of at least one further direct-current voltage generator, such as a general photovoltaic cell is connected to the dc link 26. FIG. 3 of the appended drawings shows such a variant in which a photovoltaic voltage generator 36 and a fuel cell generator 37 are connected to the dc link 26. In an embodiment of this type, the control unit 40 can converse with the control unit 22 associated with the internal combustion engine 20, as well as with the further generators 36 and 37, by means of a communication bus 39 operating, for example, in accordance with the well-known CAN protocol.

Now that the architecture of the modular energy-generating systems according to the invention has been described, their operating procedures and strategies will be described with particular reference to the main combined generating module 10.

The operation of the main combined generating module 10 is advantageously arranged in three hierarchical control levels:
level 1, or system control: this level relates to the control of the main module 10 as a whole and operates as an interface with the outside world; it controls the generation service towards the user in accordance with the demand, communicates with the central remote-control system of the utility which controls the network 17, and optionally controls a plurality of main combined generating modules of different modular systems or polygenerators and the respective devices for interfacing with the electrical network;
level 2 or local generation control: this level relates to the control of the electronic converter unit 23 for the electrical portion, and of the thermal-exchange module 28 for the thermal portion, and
level 3 or point control of the generating devices: this level relates to the direct control of the motor-generator unit 20-21 and the control of the batteries of the electrical-energy storage module 32.

Control level 1, that is the system control, can be implemented by means of functions software or a finite states machine. The strategies of this control module provide for the production of thermal and/or electrical energy in accordance with the economic and electrical-load conditions of the network 17 and with the user's local needs.

A time-plan relating to energy production may be calculated on the basis of statistical forecasts of the demand by the user and of changes in market tariffs.

According to the tariffs that are in force and according to the user's electrical demand, it is possible to provide for a strategy which aims to minimize a cost function which, as well as depending on the electrical-energy tariffs, also depends on the efficiency of the production chain of the modular combined generating system.

The strategies of control level 2 relate to generation control. The logics of the control of electrical generation are managed by the control unit 40.

In particular, this unit may be arranged to regulate the electrical power generated by the main module 10 by controlling the rate of rotation and the injection (electronic) of the fuel of the internal combustion engine 20 in a manner such that the engine operates with a predetermined output which may be a constant output or a controlled output variable in dependence on the minimizing of emissions or in dependence on thermal energy demands.

The control unit 40 may also be arranged to regulate the ratio between the electrical power and the thermal power generated by the main module 10 by controlling the rate of rotation and the torque delivered by the internal combustion engine 20 and driving the solenoid-valve or valves associated with the by-pass duct or ducts of the thermal exchange module 28 in accordance with predetermined procedures. The ratio between the electrical power and the thermal power generated can thus be varied almost freely, which is impossible with conventional generating systems.

The control unit 40 may also be arranged so that, for a given electrical power demand, by adjustment of the torque delivered and the rate of rotation of the engine 20, the engine is caused to operate at operating points which, on the one hand, satisfy the electrical power demand and, on the other hand, achieve an optimal compromise between electrical efficiency and the minimizing of emissions.

The control unit 40 is also arranged to control the operation of the main combined generating module 10, in accordance with predetermined procedures, in a mode in which it is disconnected from the network 17 or in a mode in which it is connected thereto, and to control automatic changing from one to the other of the above-mentioned two modes of operation.

A further task of the control unit 40 consists in regulating the electrical quantities at the output of the module 10 when the main combined generating module 10 is connected to the network 17 and compensating for any deviations from the sinusoidal form of the current that is absorbed by the electrical user appliances 16 or that is input into the electrical distribution network.

The control unit 40 is also arranged to detect, whilst the energy-generator unit 1 is de-activated, a condition of interruption of the service of the electrical network 17 and. then to ensure the continuity of electrical supply to the user appliances 16, or at least some of them, with electrical energy supplied by the storage module 32, that is, for a minimum period of time sufficient for the electrical generator unit comprising the engine 20 and the rotary generator 21 to be rendered operative. In comparison with conventional solutions (which provide for the combination of a UPS—Uninterruptible Power Supply, and of an electrical generating unit), the system according to the invention has the advantage of having virtually infinite autonomy and a storage system with dimensions and weights which are up to ten times lower.

The system according to the invention can change from operation in parallel with the network 17 to "island" operation, that is, operation whilst separated from the network and connected solely to the prioritized loads 16 and vice versa, without thereby leading to any type of interruption of the service, synchronizing itself appropriately with the network 17. These functions are performed by the connection of the system according to the invention in parallel with the loads whereas, in normal systems, the emergency apparatus is in series with the loads. The solution according to the invention eliminates the losses in the supplementary energy coming from the network and the need for devices for by-passing the system in the event of breakdown.

The control unit 40 can also be arranged to implement an active filtering function: with the switching device 18 closed, the inverter 25 is connected permanently in parallel with the network 17 and with the user appliances 16. In this operating mode, the control unit 40 arranges to compensate automatically for the deformations of the current which are produced by non-linear loads so that the current at the node 15, seen from the network 17 side, has a waveform which is as close as possible to sinusoidal. The filtering takes place by electronic monitoring of the output voltage and current and can therefore correct any harmonic without the need to be tuned, as is the case for normal filter.

The control unit 40 can also be arranged to implement a function for eliminating or "smoothing" voltage "holes" by continual analysis of the output voltage value and by drawing energy, as required, from the electrical-energy storage module 32, which is used as a buffer.

The main combined generating module 10 can also be used both as an inductive and as a capacitive reactive energy generator, following the load conditions of the network 17 in real time and with continuous regulation, suitably displacing the phase of the voltage and current supplied. This permits improved utilization of the lines and of the transformers of the network (that is, a reduction in losses for a given load) and improvement of the power factor for greatly variable loads.

Control level 3 provides for the implementation of strategies which in this case also are implemented by the control unit 40 of the main combined generating module 10. These strategies relate substantially to the starting of the engine-generator unit 20-21, the control of the active power generator unit in parallel with the three-phase network 17, and the control of autonomous energy generation.

The main combined generating module is started by the user as required. The starting operation may be performed by means of an electric starter motor associated with the internal combustion engine 20, or by means of the reversible electrical generator 21 if it is in the form of a reversible electrical machine, and provided that sufficient power energy is available at the terminals of the conversion unit 23.

The control of the main combined generating module 10 as a controlled power generator acting in parallel with the network 17 takes place by converting the power into direct current by the dc link 26 in dependence on the demands of the loads. In comparison with a conventional generating system, the electrical supply to the loads takes place by sharing the demand for power to be supplied in accordance with a strategy which is optimized on the basis of the load conditions (for example, rapid variations or power demands exceeding the capacity of the main generator) or on the basis of economic criteria or strategies (upon information coming from control level 1).

The electrical-energy storage module 32 ensures the continuity of the energy flow during the starting stages of the engine-generator 20-21 and during inevitable load transients.

The system can also operate on unbalanced loads.

When the module 10 is operating as an autonomous energy generator, the switching device 18 is open and the output of the converter unit 23 represents the voltage source towards the electrical users 16. As the load varies, the control unit 40 drives the conversion unit 23 in a manner such as to maintain at the output node 15 a symmetrical set of three sinusoidal voltages having effective values and frequencies within the limits of the prescribed tolerances, that is, the tolerances permissible for the user appliances 16.

The storage module 32 ensures the continuity of the energy flow during the starting stages of the engine-generator 20-21 and during the inevitable load transients.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A modular energy-generating system, comprising:
   a main combined generating module adapted to be supplied with a flow of a fuel and to generate electrical energy and thermal energy in the form of a flow of at least one first hot fluid, preferably water, the main module having an electrical output terminal or node adapted to be connected directly to electrical user appliances and which can be connected in parallel with an external electrical-energy generation and distribution network by means of a controlled switching device,
   an auxiliary generating module adapted to be supplied with thermal energy produced by the main module and to supply thermal energy at a lower temperature in the form of a flow of at least one second, cooled fluid, and
   supervision and control means arranged to control the operation of the main module and of the auxiliary module in accordance with predetermined procedures,
   the main combined generating module comprising:
      an electrical-energy generator unit including an internal combustion engine which is supplied with the fuel and is coupled to a rotary, preferably three-phase, alternating-current electrical generator,
      an electronic converter unit including an ac/dc converter connected to the output of the electrical generator, a dc/ac converter which preferably has a three-phase output and which is connected to the output of the ac/dc converter by means of a dc link and to the electrical output terminal or node of the main module by means of a filtering unit, and an electrical-energy storage module coupled to the dc link by means of a bidirectional dc/dc converter in a manner such that the dc/dc converter is arranged to permit a flow of electrical energy from the storage module to the dc link and vice versa, and
      a thermal exchange module which is connected to the internal combustion engine and is arranged to recover some of the heat generated by the engine, transferring the heat to the at least one first fluid, the thermal exchange module having control solenoid-valve means suitable for enabling the extent of the recovery of the heat generated by the internal combustion engine to be varied,
   the auxiliary generating module comprising a heat pump which is intended to receive a flow of a hot fluid from the thermal exchange module or from the engine and which is adapted to output a flow of the at least one second fluid at relatively lower temperature,
   the supervision and control means being arranged for:
      regulating the electrical power generated by the main module by controlling the rate of rotation and the injection of fuel in the internal combustion engine in a manner such that the engine operates with a predetermined output, regulating the ratio between the electrical power and the thermal power generated by the main module by controlling the rate of rotation and the torque delivered by the internal combustion engine and driving the control solenoid-valve means in accordance with predetermined procedures, controlling the operation of the main module in accordance with predetermined procedures in a mode in which it is disconnected from the network or in a mode in which it is connected thereto, and controlling automatic changing from one to the other of the above-mentioned operative modes, when the main module is connected to the network, regulating the output voltage and the power factor of the main module and compensating for any deviations from the sinusoidal form of the current delivered towards the electrical user appliances, and detecting a condition of interruption of service of the electrical network and ensuring the continuity of electrical supply to at least some of the electrical user appliances with electrical energy delivered by the storage module for a minimum period of time sufficient to render the, electrical generator unit operative.

2. A modular energy-generating system-according to claim 1, in which a control unit including a digital signal processor is associated with the electrical generator unit, the control unit being connected to a control input of the switching device, to the ac/dc converter and the dc/ac converter of the converter unit, to the dc/dc converter, and to an electronic control unit of the internal combustion engine, as well as to means for detecting the voltage and the current in the network upstream of the switching device.

3. A modular energy-generating system according to claim 1, in which the dc/dc converter is arranged to perform the recharging of the electrical-energy storage module and is arranged in a manner such that its side which is connected to the dc link is at a higher voltage than its side which is connected to the electrical-energy storage module.

4. A modular energy-generating system according to claim 1, in which the output of at least one further direct-current voltage generator, such as a photo-voltaic generator or a fuel cell generator is connected to the dc link.

5. A modular energy-generating system according to claim 1, in which the auxiliary generating module comprises a heat pump of the chemical type with desiccant liquid.

6. A modular energy-generating system according to claim 5, in which the auxiliary generating module further comprises thermal storage means.

7. A modular energy-generating system according to claim 1, in which the supervision and control means are arranged to drive the converters in a manner such that the main combined generating module is adapted to supply either capacitive or inductive reactive energy, the reactive energy being coupled to the network by means of the switching device.

* * * * *